(12) United States Patent
Lee

(10) Patent No.: US 9,459,481 B2
(45) Date of Patent: Oct. 4, 2016

(54) IN-CELL TOUCH DISPLAY PANEL STRUCTURE

(71) Applicant: SuperC-Touch Corporation, New Taipei (TW)

(72) Inventor: Hsiang-Yu Lee, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 72 days.

(21) Appl. No.: 13/795,788

(22) Filed: Mar. 12, 2013

(65) Prior Publication Data

US 2013/0242211 A1  Sep. 19, 2013

(30) Foreign Application Priority Data

Mar. 13, 2012 (TW) .............................. 101204479 U

(51) Int. Cl.
*G02F 1/1333* (2006.01)
*G06F 3/041* (2006.01)

(52) U.S. Cl.
CPC ......... *G02F 1/13338* (2013.01); *G06F 3/0412* (2013.01)

(58) Field of Classification Search
CPC combination set(s) only.
See application file for complete search history.

(56) References Cited

U.S. PATENT DOCUMENTS

| | | | |
|---|---|---|---|
| 8,552,989 B2 * | 10/2013 | Hotelling et al. | 345/173 |
| 8,866,787 B2 * | 10/2014 | Chang et al. | 345/173 |
| 9,214,501 B2 * | 12/2015 | Lee | G06F 3/0412 |
| 2009/0322702 A1 * | 12/2009 | Chien et al. | 345/174 |
| 2011/0134050 A1 * | 6/2011 | Harley | 345/173 |
| 2011/0156021 A1 * | 6/2011 | Heo | H01L 29/7869 257/43 |
| 2011/0187677 A1 * | 8/2011 | Hotelling et al. | 345/174 |
| 2012/0105337 A1 * | 5/2012 | Jun et al. | 345/173 |
| 2012/0162584 A1 * | 6/2012 | Chang et al. | 349/106 |
| 2013/0044074 A1 * | 2/2013 | Park et al. | 345/174 |
| 2013/0335376 A1 * | 12/2013 | Lee | 345/174 |
| 2014/0152619 A1 * | 6/2014 | Hotelling et al. | 345/174 |

OTHER PUBLICATIONS

WO/2012/121517 to Lee, "Voltage Fluctuation-based Capacitive Touch Detection Means, Detection Method and Touch Screen Panel and Display Device with Built-in Capacitive Touch Screen Panel," Date Published Sep. 13, 2012.*

* cited by examiner

*Primary Examiner* — Lauren Nguyen
*Assistant Examiner* — Anthony G Quash
(74) *Attorney, Agent, or Firm* — Muncy, Geissler, Olds & Lowe, P.C.

(57) ABSTRACT

An in-cell touch display panel includes a first substrate, a second substrate parallel to the first substrate, a liquid crystal layer configured between the first and second substrates, and a black matrix layer disposed at a surface of the first substrate facing to the liquid crystal layer. The black matrix includes a plurality of opaque conductive lines. The opaque conductive lines are divided into a first group, a second group and a third group of opaque conductive lines. The second group of opaque conductive lines is formed with N polygonal regions where N is a positive integer. The opaque conductive lines in any one of the polygonal regions are electrically connected together while any two polygonal regions are not electrically connected.

7 Claims, 4 Drawing Sheets

IN-CELL TOUCH DISPLAY PANEL STRUCTURE

BACKGROUND OF THE INVENTION

1. Field of the Invention

The present invention relates to a structure of touch display panel and, more particularly, to an in-cell touch display panel structure.

2. Description of Related Art

A conventional touch display panel includes a touch panel and a display unit overlapped with the touch panel. The touch panel is configured as an operation interface. The touch panel is transparent so that an image generated by the display unit can be viewed directly by a user without being sheltered by the touch panel. Such well known skill of the touch panel may increase additional weight and thickness of the touch display panel, and may further reduce the light penetration rate of the touch display panel.

On-cell and in-cell touch technology were invented to overcome the drawbacks of traditional touch technology described above. The on-cell technology is to dispose a sensor on the back side of a color filter substrate to form a completed color filter substrate. One of the on-cell touch technologies is provided to dispose a touch sensor on a thin film and then bond the thin film onto the upper one of the two substrates.

The in-cell technology is to dispose the sensor within the LCD cell structure. Currently, there are resistive, capacitive and optical three primary in-cell touch technologies, wherein the resistive touch technology employs two conductive substrates and the voltage variation of a common layer between the two substrates for determining a touch position on the touch display panel.

The in-cell touch technology is provided to integrate the touch sensor within the display unit so that the display unit is provided with the ability of the touch panel. Therefore, the touch display panel does not need to be bonded with an additional touch panel so as to simplify the assembly procedure. Such skill is generally developed by TFT LCD manufactures.

There is older touch control technology known as outcell, which is typically applied to the resistive and capacitive touch panels. The out-cell touch technology is provided to add a touch module onto a display module. The touch module and the display module can be manufactured by the two separated parties.

However, for all the in-cell, on-cell and out-cell touch technologies, they all need a sensing layer to be configured on an upper or lower glass substrate, which not only increases the manufacturing cost but also complicates the manufacturing process. Therefore, it desired for the aforementioned touch display panel structure to be improved.

SUMMARY OF THE INVENTION

The object of the present invention is to provide an in-cell touch display panel structure for greatly decreasing the weight and thickness of a TFT touch LCD panel and also significantly reducing the material and manufacturing cost.

To achieve the object, there is provided an in-cell touch display panel structure, which includes a first substrate, a second substrate, a liquid crystal layer and a conducted black matrix. The second substrate is parallel to the first substrate. The liquid crystal layer is configured between the first and second substrates. The black matrix is disposed at a surface of the first substrate opposite to the liquid crystal layer. The black matrix was formed by three elements, each being a group of plurality opaque conductive lines. The plurality opaque conductive lines are divided into a first group of opaque conductive lines, a second group of opaque conductive lines and a third group of opaque conductive lines. The second group of opaque conductive lines is formed with N polygonal regions, where N is a positive integer. The opaque conductive lines in any one of the polygonal regions are electrically connected together while any two polygonal regions are not electrically connected, so as to form a single-layered touch pattern on the black matrix layer.

DETAILED DESCRIPTION OF THE PREFERRED EMBODIMENT

Figure 1:
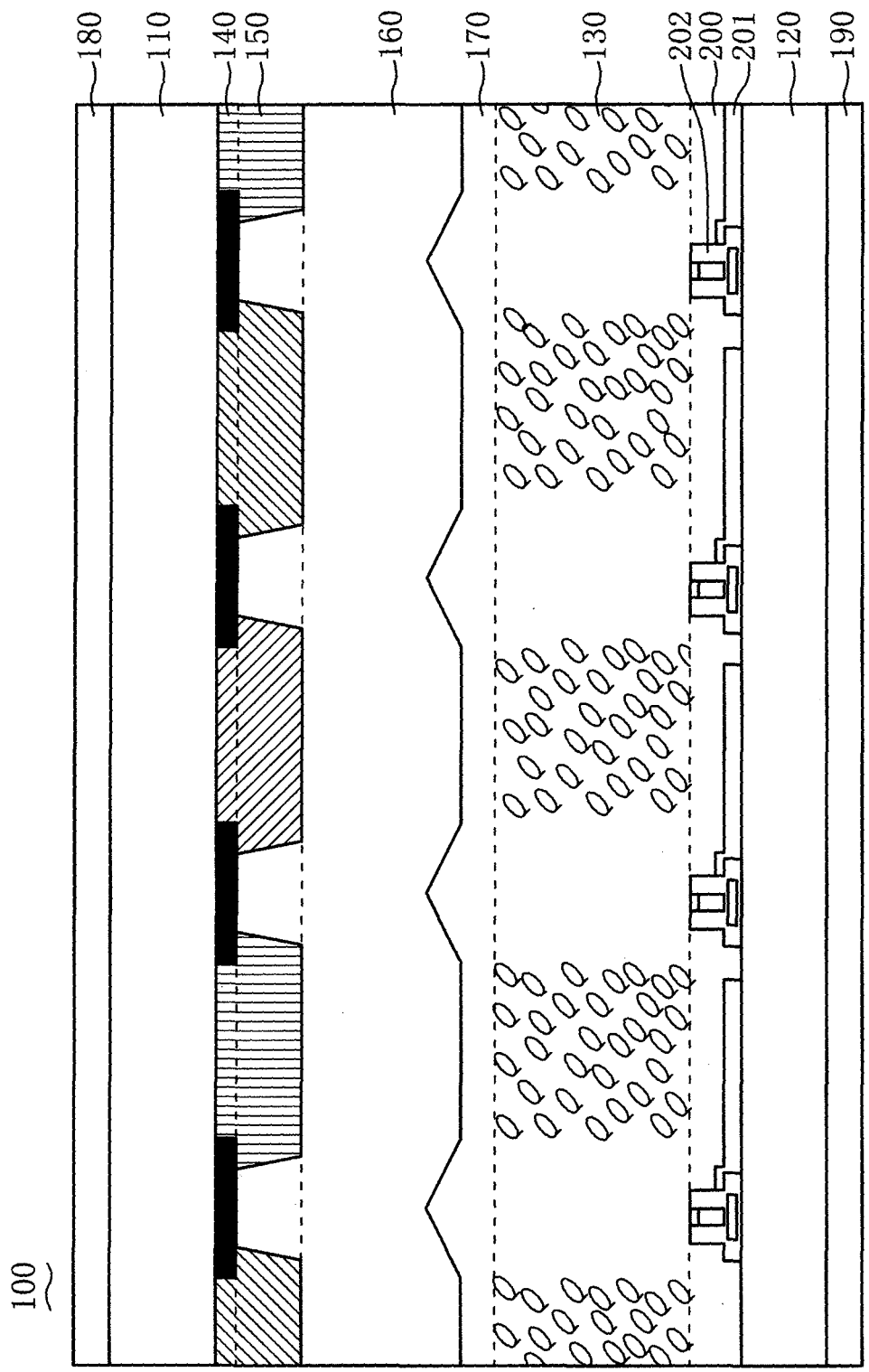
FIG. 1 shows an in-cell touch display panel structure in accordance with a preferred embodiment of the present invention.

As shown in FIG. 1, there is shown an in-cell touch display panel structure 100 in accordance with a preferred embodiment of the present invention. The in-cell touch display panel structure 100 includes a first substrate 110, a second substrate 120, a liquid crystal layer 130, a black matrix layer 140, a color filter layer 150, an over coating layer 160, a common electrode (Vcom) layer 170, a first polarizer layer 180, a second polarizer layer 190, and a thin film transistor (TFT) layer 200.

The first substrate 100 and the second substrate 120 are preferably glass substrates and are parallel to each other. The liquid crystal layer 130 is disposed between the first and second substrates 110, 120.

The black matrix layer 140 is between substrate 110 and liquid crystal layer 130 and is disposed right next to the first substrate 110, The black matrix layer 140 is composed of a plurality of opaque conductive lines.

Figure 2:
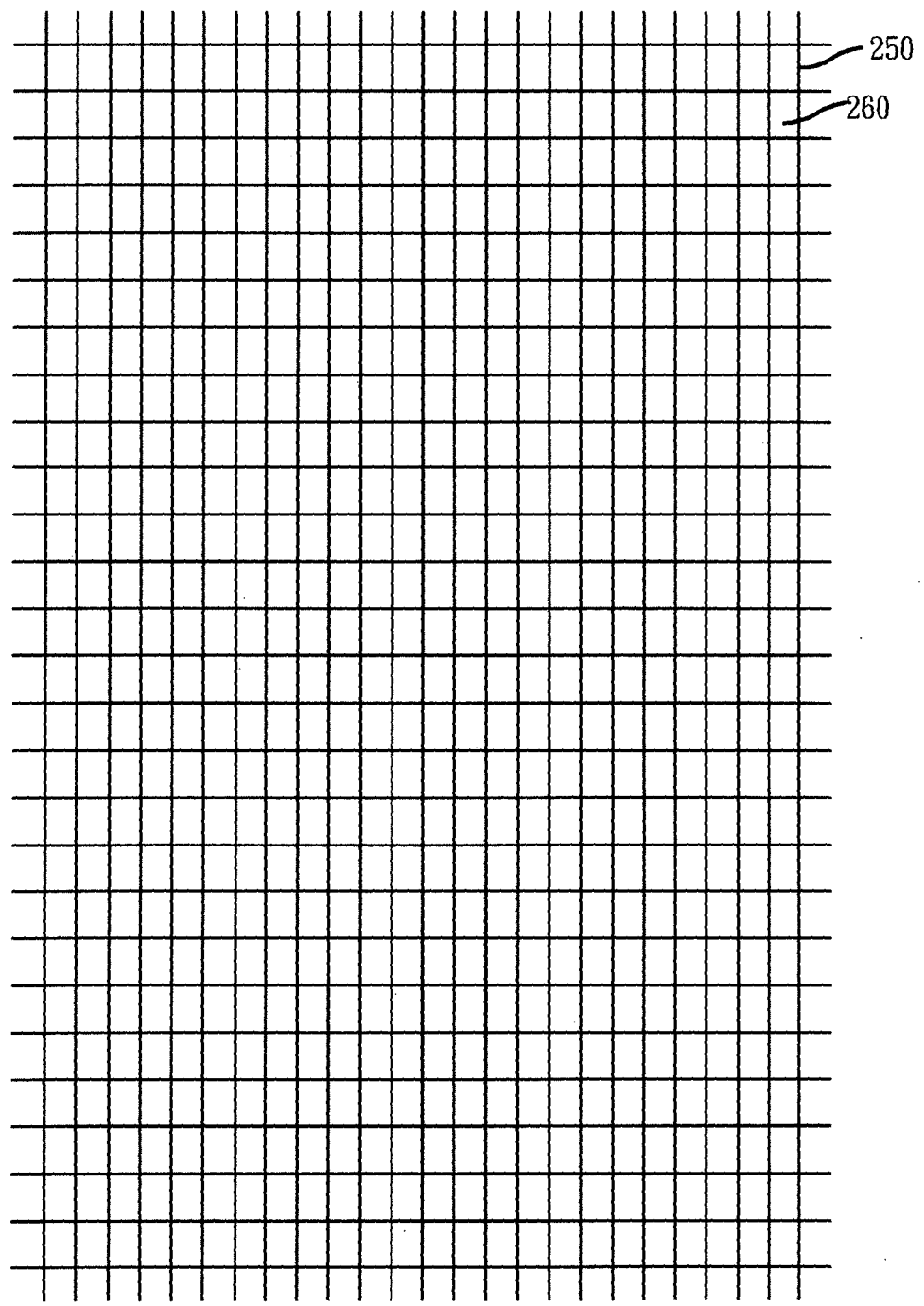
FIG. 2 shows a prior black matrix layer.

FIG. 2 shows a prior black matrix layer 250. As shown in FIG. 2, the prior black matrix layer 250 is composed of lines of insulating material that are black and opaque. The lines of black insulating material are arranged as a checkerboard pattern and a color filter 260 is disposed among the lines of black insulating material.

In the present invention, the opaque black insulating material of the black matrix layer 250 are replaced by opaque conductive material, and a touch sensing pattern structure is formed on the black matrix layer. Therefore, there is no need to dispose a sensing electrode layer (ITO) on the upper glass substrate or lower glass substrate of the LCD panel, thereby saving the manufacturing cost simplifying the assembly procedure, and further improving the panel yield.

Figure 3:
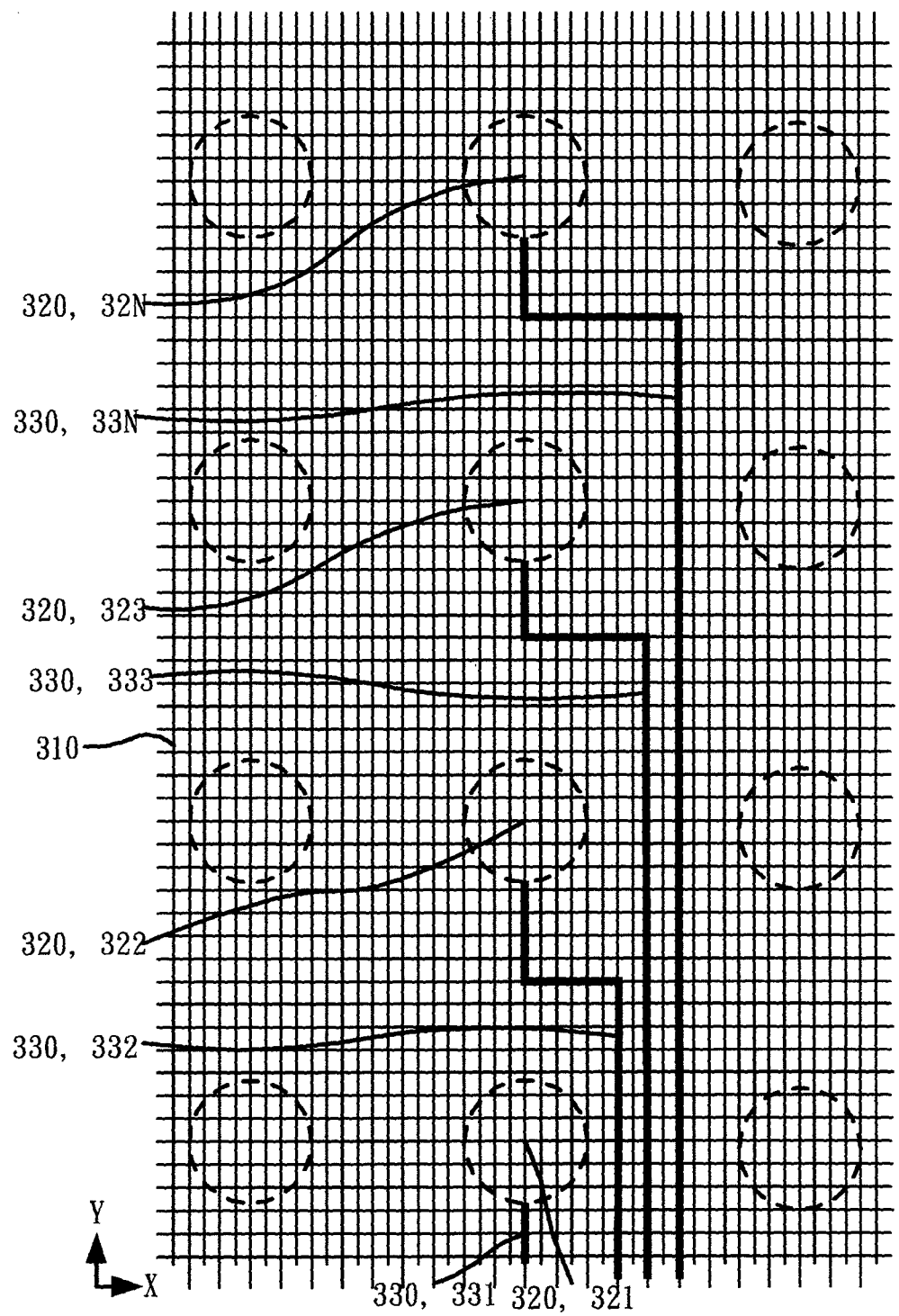
FIG. 3 is a pattern diagram of the black matrix layer in accordance with the present invention.

FIG. 3 is a patent diagram of the black matrix layer 140 in accordance with the present invention. As shown in FIG. 3, the black matrix layer 140 is composed of a plurality of opaque conductive lines. The opaque conductive lines of the black matrix layer 140 are arranged in vertical and horizontal direction and they are across each other.

The opaque conductive lines of the black matrix 140 are made of material having characteristics of opaque and electric conduction. In this embodiment, the opaque conductive lines are made of black conductive material.

The plurality of opaque conductive lines are divided into a first group opaque conductive lines 310, a second group opaque conductive lines 320, and a third group of opaque conductive lines 330.

The second group of opaque conductive lines 320 is formed with N polygonal regions denoted by numerals 321-32N, where N is a positive integer. The opaque conductive lines in any one of the polygonal regions are electrically connected together, while any two polygonal regions are not electrically connected, so as to form a single-layered touch sensing pattern on the black matrix 140. Each of the polygonal regions 321-32N may be formed in a triangle, square, rhombus, hexagon, octagon, or round shape. In this embodiment, the polygonal regions 321-32N are formed in round shapes that are deemed as the polygonal regions with infinite number of edges.

The third group of opaque conductive lines 330 is formed with N conductive traces denoted by numerals 331-33N, where N is a positive integer. Each of the N conductive traces is electrically connected to a corresponding polygonal region 321-32N, i.e., the conductive traces 331-33N are electrically connected to the polygonal regions 321-32N, respectively, while any two conductive traces 331-33N are not electrically connected.

Figure 4:
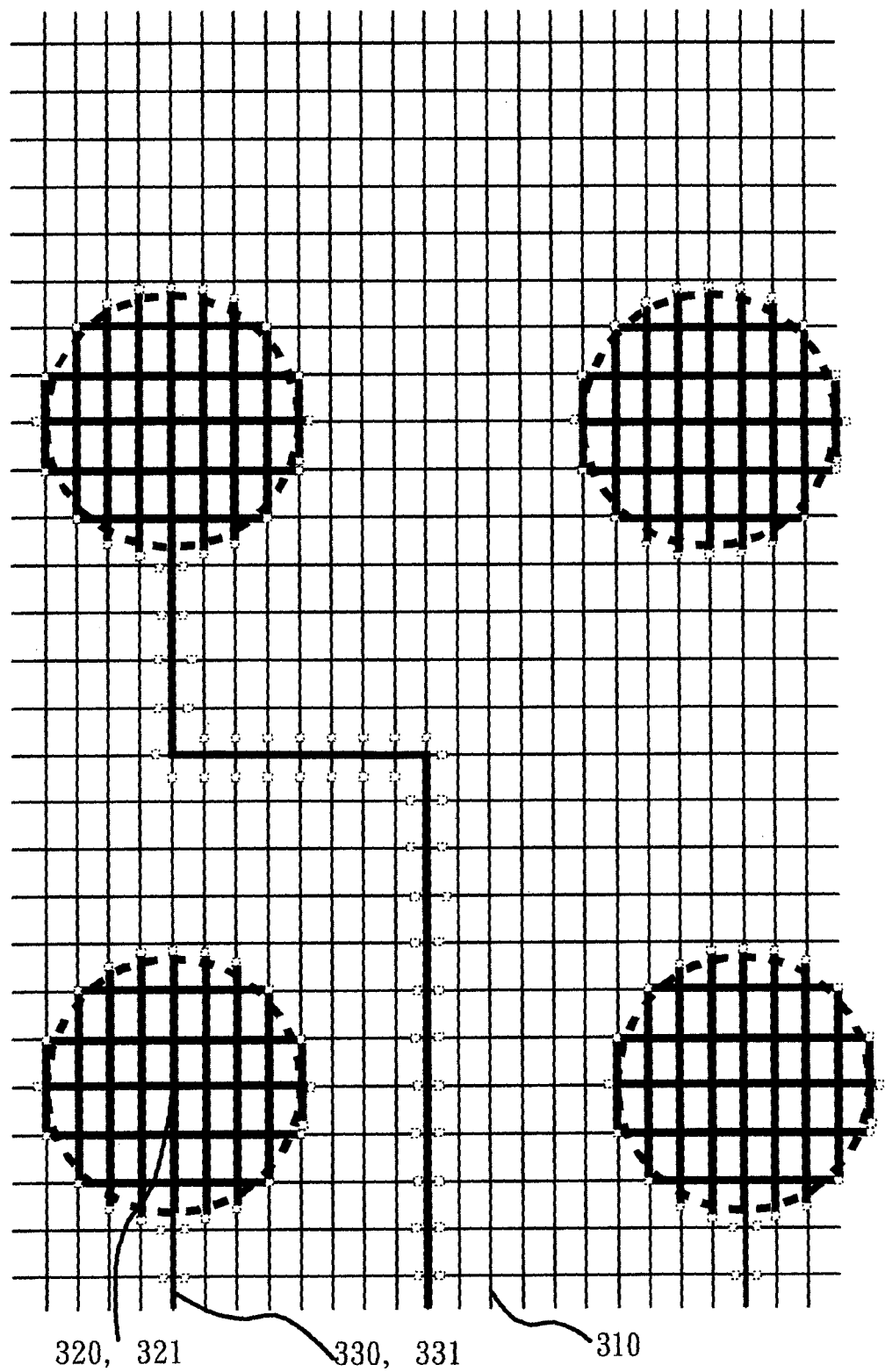
FIG. 4 is a detail view of the black matrix layer in accordance with the present invention.

FIG. 4 is a detail view of the black matrix layer 140 in accordance with the present invention. As shown in FIG. 4, the first group of opaque conductive lines 310 is spaced apart from (i.e., not electrically connected to) the second group of opaque conductive lines 320 and the third group of opaque conductive lines 330. In other words, the first group of opaque conductive lines 310 and the second groups of opaque conductive lines 320 are not connected by cutting off opaque conductive lines, as indicated by small circles in FIG. 4, in the prior black matrix layer. Similarly, the first group of opaque conductive lines 310 and third group of opaque conductive lines 330 are not connected by cutting off conductive lines, as indicated by small circles in FIG. 4, in the prior black matrix layer. Therefore, the second group of opaque conductive lines 320 can be formed with a single-layered touch sensing pattern on the black matrix layer 140. It is noted that cutting the conductive lines herein does not mean to first form the prior black matrix layer 250 shown in FIG. 2 and then cut off corresponding conductive lines. Instead, when proceeding with mask layout of the black matrix 140, the first group of opaque conductive lines 310 and the second group of opaque conductive lines 320 are formed by using layout tools, such as Laker or Virtuso, to allow the mask to be capable of spacing the first group of opaque conductive lines 310, the second group of opaque conductive lines 320 and the third group of opaque conductive lines 330 from one another. Accordingly, there is no additional procedure required in the LCD manufacturing process.

The color filter layer 150 is disposed among the plurality of opaque conductive lines of the black matrix layer 140 and on the surface of the plurality of opaque conductive lines.

The over coating layer 160 is disposed on the surface of the color filter layer 150.

The common electrode layer 170 is disposed between the first substrate 110 and the second substrate 120. Preferably, the common electrode layer 170 is disposed on the surface of the over coating layer 160.

The first polarizer layer 180 is disposed at one surface of the first substrate 110 opposite to the other surface of the first substrate 110 facing the liquid crystal layer 130.

The second polarizer layer 190 is disposed at one surface of the second substrate 120 opposite to the other surface of the second substrate 120 facing the liquid crystal layer 130.

The thin film transistor (TFT) layer 200 is disposed at the surface of the second substrate 120 facing the liquid crystal layer 130. The TFT layer 200 is composed of TFTs 202 and transparent electrodes 201.

In view of the foregoing, it is known that the present invention is capable of forming a single-layered touch pattern on the black matrix layer 140, so as to have the following advantages:

1. there is no need to have a sensing electrode layer formed on the upper glass substrate or lower glass substrate of the LCD panel, thereby lowering the cost and decreasing the number of manufacturing steps; and 2. because there is no additional touch sensing electrode layer, the manufacturing process can be greatly simplified, so as to significantly save material cost and processing cost.

Although the present invention has been explained in relation to its preferred embodiment, it is to be understood that many other possible modifications and variations can be made without departing from the spirit and scope of the invention as hereinafter claimed.

What is claimed:

1. An in-cell touch display panel structure, comprising:
   a first substrate;
   a second substrate parallel to the first substrate;
   a liquid crystal layer configured between the first substrate and the second substrates; and
   a black matrix layer disposed at one surface of the first substrate and facing the liquid crystal layer;
   wherein the black matrix layer is composed of a plurality of opaque conductive lines, the plurality of opaque conductive lines of the black matrix layer are arranged in a first direction and a second direction, and the plurality of opaque conductive lines are divided into a first group of opaque conductive lines, a second group of opaque conductive lines, and a third group of opaque conductive lines, the second group of opaque conductive lines being formed to be N polygonal regions, where N is a positive integer, the opaque conductive lines in any one of the polygonal regions being electrically connected together while any two polygonal regions are not electrically connected and every polygonal region is a sensor electrode for touch sensing, the third group of opaque conductive lines being formed to be N conductive traces, each of the N conductive traces being electrically connected to a corresponding polygonal region, while any two conductive traces are not electrically connected, so as to form a single-layered touch pattern on the black matrix layer, in which the first group of opaque conductive lines, the N polygonal regions and the N conductive traces are of the same layer and the first group of opaque conductive lines is spaced apart from the N polygonal regions and the N conductive traces.

2. The in-cell touch display panel structure as claimed in claim 1, wherein the first direction is perpendicular to the second direction.

3. The in-cell touch display panel structure as claimed in claim 2, further comprising a color filter layer that is disposed among the plurality of opaque conductive lines of the black matrix layer and on a surface of the plurality of opaque conductive lines.

4. The in-cell touch display panel structure as claimed in claim 3, further comprising an over coating layer disposed on a surface of the color filter.

5. The in-cell touch display panel structure as claimed in claim 4, further comprising a common electrode layer disposed between the first substrate and the second substrate.

6. The in-cell touch display panel structure as claimed in claim 5, further comprising:
- a first polarizer layer disposed at one surface of the first substrate opposite to the other surface of the first substrate facing the liquid crystal layer;
- a second polarizer layer disposed at one surface of the second substrate opposite to the other surface of the second substrate facing the liquid crystal layer,
- a thin film transistor (TFT) layer disposed at the surface of the second substrate facing the liquid crystal layer.

7. The in-cell touch display panel structure as claimed in claim 6, wherein each of the polygonal regions is formed in a triangle, square, rhombus, hexagon, octagon, or round shape.

\* \* \* \* \*